June 19, 1956     W. E. SCHADE     2,750,839
THREE COMPONENT PHOTOGRAPHIC OBJECTIVE
COMPRISING FIVE ELEMENTS
Filed Aug. 3, 1953

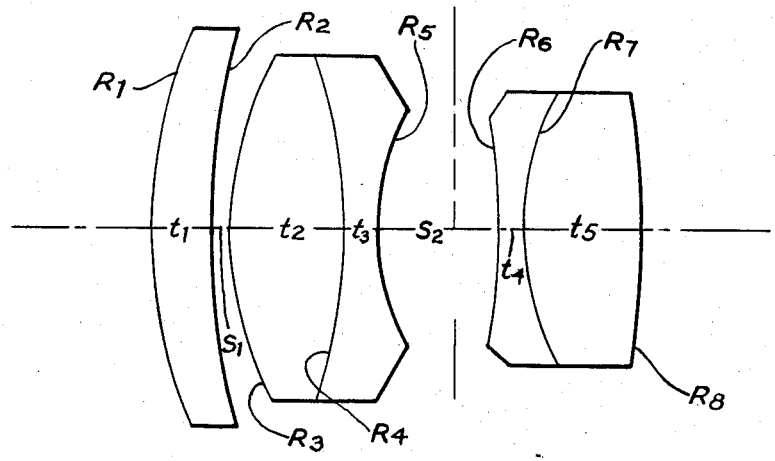

Fig. 1

Fig. 2

| $f = 100$ mm | | | $f/3.5$ | $\pm 17°$ |
|---|---|---|---|---|
| Lens | N | V | Radii | Thicknesses |
| 1 | 1.6968 | 56.2 | $R_1 = +46.03$ mm | $t_1 = 6.02$ mm |
|   |        |      | $R_2 = +75.77$   | $S_1 = 0.11$ |
| 2 | 1.6968 | 56.2 | $R_3 = +27.66$   | $t_2 = 10.68$ |
| 3 | 1.8037 | 41.8 | $R_4 = -72.48$   | $t_3 = 2.57$ |
|   |        |      | $R_5 = +20.80$   | $S_2 = 10.61$ |
| 4 | 1.5956 | 39.7 | $R_6 = -147.8$   | $t_4 = 1.99$ |
| 5 | 1.7445 | 45.8 | $R_7 = +27.93$   | $t_5 = 9.93$ |
|   |        |      | $R_8 = -67.76$   | |

Fig. 3

| $f = 100$ mm | | | $f/2.8$ | $\pm 34°$ |
|---|---|---|---|---|
| Lens | N | D | Radii | Thicknesses |
| 1 | 1.6968 | 56.2 | $R_1 = +57.32$ mm | $t_1 = 8.00$ mm |
|   |        |      | $R_2 = +118.8$   | $S_1 = 0.51$ |
| 2 | 1.6968 | 56.2 | $R_3 = +30.63$   | $t_2 = 10.62$ |
| 3 | 1.8037 | 41.8 | $R_4 = -81.42$   | $t_3 = 2.56$ |
|   |        |      | $R_5 = +25.08$   | $S_2 = 10.99$ |
| 4 | 1.5956 | 39.7 | $R_6 = -342.5$   | $t_4 = 3.80$ |
| 5 | 1.7445 | 45.6 | $R_7 = +47.90$   | $t_5 = 10.99$ |
|   |        |      | $R_8 = -90.43$   | |

Willy E. Schade
INVENTOR.

BY Daniel J. Mayne
ATTORNEY

Harold F. Bennett
AGENT

United States Patent Office 2,750,839
Patented June 19, 1956

2,750,839
THREE COMPONENT PHOTOGRAPHIC OBJECTIVE COMPRISING FIVE ELEMENTS
Willy E. Schade, Rochester, N. Y., assignor to Eastman Kodak Company, Rochester, N. Y., a corporation of New Jersey
Application August 3, 1953, Serial No. 371,947
9 Claims. (Cl. 88—57)

This invention relates to photographic lenses of the type consisting of two cemented doublets enclosing a diaphragm space and a front positive singlet, the middle component being negative and all three components being concave toward the diaphragm space.

Lenses of this type have been found very useful for use at apertures of about f/2.8 to about f/3.5 and covering an angular field of ±20° to 35°. Each doublet consists of a bi-concave element next to the diaphragm space cemented to a bi-convex element. Lenses of this type are compact and convenient, the overall length generally being between 0.35 f and 0.55 f, and they compare favorably with other types of five element objectives and even with some objectives having a more complex structure.

According to the present invention a photographic objective of the above described type is made up of five lens elements all of which have a refractive index between 1.55 and 1.9, the index of the front singlet being greater than 1.68, and the index of the rear element of each cemented doublet exceeding that of the front element thereof by between 0.10 and 0.17. These features of refractive index combined with one or more of the preferred features relating to the shapes of the elements as described below cooperate to produce a highly corrected lens with particularly well corrected zonal astigmatism and curvature of field.

According to one preferred feature of the invention the curvature of the front surface of the front component of the objective exceeds 1.1 times the curvature of the rear surface of this component by between 0.5/f and 0.85/f. The factor 1.1 is used here as a simple approximate way to make allowance for the effect of the thickness of the front component in constricting the diameter of the axial bundle of rays before they strike the second surface.

According to a second preferred feature of the invention the curvature of the rear surface of the rear component numerically exceeds that of the front surface thereof by between 0.65/f and 1/f. The axial bundle is nearly parallel within this component and no factor other than unity is needed.

According to a third preferred feature of the invention the dioptric power of the cemented surface in the second component is numerically between ⅙ and ⅑ that of the whole objective.

In cooperation with the second and third preferred features it is advantageous to have the power of the front component of the objective between 0.40 and 0.80 times that of the objective as a whole or to combine the first preferred feature therewith.

Conveniently the radius of curvature of every lens surface is between f/6 and 5 f, and the power of the second component is between −0.8 and −1.7 times and that of the rear component between +0.7 and +1.6 times that of the whole objective.

In the accompanying drawing:

Fig. 1 shows an objective according to the invention in diagrammatic axial section.

Figs. 2 and 3 give constructional data for two specific examples thereof.

This data is given for a focal length of 100 mm. and is as follows:

Example 1, Fig. 2

| Lens | N | V | Radii, mm. | Thicknesses, mm. |
|---|---|---|---|---|
| 1 | 1.6968 | 56.2 | $R_1 = + 46.03$ | $t_1 = 6.02$ |
|   |        |      | $R_2 = + 75.77$ | $s_1 = 0.11$ |
| 2 | 1.6968 | 56.2 | $R_3 = + 27.66$ | $t_2 = 10.68$ |
| 3 | 1.8037 | 41.8 | $R_4 = - 72.48$ | $t_3 = 2.57$ |
|   |        |      | $R_5 = + 20.80$ | $s_2 = 10.61$ |
|   |        |      | $R_6 = -147.8$ |  |
| 4 | 1.5956 | 39.7 |                | $t_4 = 1.99$ |
| 5 | 1.7445 | 45.8 | $R_7 = + 27.93$ | $t_5 = 9.93$ |
|   |        |      | $R_8 = - 67.76$ | BF = 68.5 |

Example 2, Fig. 3

| Lens | N | V | Radii, mm. | Thicknesses, mm. |
|---|---|---|---|---|
| 1 | 1.6968 | 56.2 | $R_1 = + 57.32$ | $t_1 = 8.00$ |
|   |        |      | $R_2 = +118.8$ | $s_1 = 0.51$ |
| 2 | 1.6968 | 56.2 | $R_3 = + 30.63$ | $t_2 = 10.62$ |
| 3 | 1.8037 | 41.8 | $R_4 = - 81.42$ | $t_3 = 2.56$ |
|   |        |      | $R_5 = + 25.08$ | $s_2 = 10.99$ |
|   |        |      | $R_6 = -342.5$ |  |
| 4 | 1.5956 | 39.7 |                | $t_4 = 3.80$ |
| 5 | 1.7445 | 45.6 | $R_7 = + 47.90$ | $t_5 = 10.99$ |
|   |        |      | $R_8 = - 90.43$ | BF = 65.0 |

Data for three additional examples is as follows:

Example 3

| Lens | N | V | Radii, mm. | Thicknesses, mm. |
|---|---|---|---|---|
| 1 | 1.6968 | 56.2 | $R_1 = + 57.22$ | $t_1 = 7.99$ |
|   |        |      | $R_2 = +118.7$ | $s_1 = 0.51$ |
| 2 | 1.6968 | 56.2 | $R_3 = + 29.48$ | $t_2 = 10.63$ |
| 3 | 1.8037 | 41.8 | $R_4 = - 75.51$ | $t_3 = 2.56$ |
|   |        |      | $R_5 = + 23.14$ | $s_2 = 10.99$ |
|   |        |      | $R_6 = -154.2$ |  |
| 4 | 1.5956 | 39.7 |                | $t_4 = 4.01$ |
| 5 | 1.7450 | 46.4 | $R_7 = + 37.22$ | $t_5 = 11.00$ |
|   |        |      | $R_8 = - 70.55$ | BF = 67.4 |

Example 4

| Lens | N | V | Radii, mm. | Thicknesses, mm. |
|---|---|---|---|---|
| 1 | 1.6968 | 56.2 | $R_1 = + 58.64$ | $t_1 = 8.03$ |
|   |        |      | $R_2 = +124.4$ | $s_1 = 0.51$ |
| 2 | 1.6968 | 56.2 | $R_3 = + 29.50$ | $t_2 = 10.68$ |
| 3 | 1.8037 | 41.8 | $R_4 = - 71.94$ | $t_3 = 2.57$ |
|   |        |      | $R_5 = + 23.17$ | $s_2 = 9.69$ |
|   |        |      | $R_6 = -128.4$ |  |
| 4 | 1.5956 | 39.7 |                | $t_4 = 4.02$ |
| 5 | 1.7445 | 45.6 | $R_7 = + 36.42$ | $t_5 = 9.93$ |
|   |        |      | $R_8 = - 66.24$ | BF = 68.1 |

Example 5

| Lens | N | V | Radii, mm. | Thicknesses, mm. |
|---|---|---|---|---|
| 1 | 1.6968 | 56.2 | $R_1=+\ 50.22$ | $t_1=\ 7.04$ |
|   |        |      | $R_2=+\ 89.19$ | $s_1=\ 0.25$ |
| 2 | 1.6968 | 56.2 | $R_3=+\ 28.46$ | $t_2=10.68$ |
| 3 | 1.8037 | 41.8 | $R_4=-\ 90.73$ | $t_3=\ 2.57$ |
|   |        |      | $R_5=+\ 22.19$ | $s_2=11.03$ |
| 4 | 1.5956 | 39.7 | $R_6=-233.1$ | $t_4=\ 3.00$ |
| 5 | 1.7445 | 45.6 | $R_7=+\ 33.96$ | $t_5=\ 9.94$ |
|   |        |      | $R_8=-\ 82.46$ | BF=65.7 |

In all these tables the lens elements of the objective are numbered in the first column from front to rear and the refractive indices N for the D line of the spectrum and the dispersive indices V are given in the second and third columns. In the last two columns the radii of curvature R of the lens surfaces, the thicknesses $t$ of the lens elements and the spaces $s$ between lens elements are given, each being numbered by subscripts from front to rear. BF denotes the back focal length.

Examples 1, 3 and 4 were designed for use at an aperture of f/3.5 to cover moderate fields of ±17°, ±28° and ±28° respectively and were found to give extremely sharp image definition over this moderate field.

Examples 2 and 5 were designed for use at an aperture of f/2.8 and to cover fields of ±34° and ±23° respectively. Example 2 is intended to be made up in a focal length of about 1 inch and the other examples at longer focal lengths up to about 3 inches.

The following table gives the spherical aberration of the marginal and zonal rays and the sine condition coma of the marginal and zonal rays of each of the above examples. The maximum aperture has already been indicated and the zonal ray is taken at 0.7 of the maximum aperture. All the examples were computed in "D" light except Example 5, which was computed in "g" light.

|  | Spher. Aber. | | Coma | |
|---|---|---|---|---|
|  | Margin, Millimeter | Zone, Millimeter | Margin, Millimeter | Zone, Millimeter |
| Ex. 1 | +0.04 | −0.33 | −0.01 | −0.065 |
| Ex. 2 | +0.70 | −0.11 | −0.12 | −0.13 |
| Ex. 3 | +0.30 | −0.065 | +0.10 | +0.005 |
| Ex. 4 | +0.26 | −0.10 | +0.085 | −0.00 |
| Ex. 5 | +1.24 | −0.14 | +0.14 | −0.08 |

The distortion and the sagittal and tangential curvature of field are given in the following table.

|  | Distortion, Millimeter | Sagittal Curvature, Millimeter | Tangential Curvature, Millimeter |
|---|---|---|---|
| Ex. 1: | | | |
| 8.58° | +.01 | −.12 | +.08 |
| 16.62° | +.02 | −.24 | +.11 |
| Ex. 2: | | | |
| 15° | +.24 | −.92 | −.44 |
| 21° | +.60 | −1.38 | −.30 |
| 31° | +.87 | −.17 | −.24 |
| 34° | +.14 | +1.37 | −.71 |
| Ex. 3: | | | |
| 20° | +.34 | −.79 | +.01 |
| 28° | +.35 | −.05 | −.12 |
| Ex. 4: | | | |
| 20° | +.35 | −.79 | −.10 |
| 28° | +.42 | +.04 | −.17 |
| Ex. 5: | | | |
| 15° | +.13 | −.40 | +.10 |
| 20° | +.23 | −.47 | −.02 |
| 24° | +.22 | −.28 | −.40 |

The Petzval sum varies from +0.0021 in Example 1 to +0.0037 in Example 2. The unusually small curvature of field at all intermediate zones will be noted.

It is easily seen from the above tables of data that each example embodies the features of the invention relative to the refractive indices, and that each radius of curvature is between f/6 and 5/f. The following table gives values of curvatures and powers showing that each example also embodies all the preferred features of the invention.

|  | $\frac{1}{R_1}-\frac{1.1}{R_2}$ | $\frac{1}{R_5}-\frac{1}{R_6}$ | $\frac{N_3-N_2}{R_4}$ |
|---|---|---|---|
| Ex. 1 | 0.721 | −0.802 | −0.148 |
| Ex. 2 | 0.758 | −0.784 | −.118 |
| Ex. 3 | 0.821 | −0.731 | −.149 |
| Ex. 4 | 0.821 | −0.769 | −.142 |
| Ex. 5 | 0.819 | −0.813 | −.131 |

By means of these features of structure I have provided these compact and relatively simple objectives with high illumination at the edge of the field and with the high degree of correction of the aberrations shown above.

I claim:

1. A photographic objective consisting of two cemented doublets enclosing a diaphragm space and a simple positive element axially aligned in front thereof, the middle component being negative and all three components being concave toward the diaphragm space, in which the simple front component has a refractive index greater than 1.68 and is so shaped that the curvature of the front surface thereof exceeds 1.1 times the curvature of the rear surface thereof by between 0.5/f and 0.85/f where f is the focal length of the objective, the power of the cemented surface of the middle component is between ⅙ f and ⅛ f, and each of the two rear components consists of a biconvex element cemented to a biconcave element, the refractive index of the rear element of each doublet exceeding that of the front element thereof by between 0.10 and 0.17, the radius of curvature of each optical surface of the objective being between f/6 and 5 f, the over-all length of the objective being between 0.35 f and 0.55 f, and each refractive index being between 1.55 and 1.90.

2. An objective according to claim 1 in which the curvature of the rear surface of the rear component numerically exceeds that of the front surface thereof by between 0.65/f and 1/f.

3. An objective according to claim 1 in which the dioptric power of the front component is between +0.5/f and +0.8/f, that of the middle component is between −0.8/f and −1.7/f, and that of the rear component is between +0.7/f and +1.6/f.

4. A photographic objective consisting of two cemented doublets enclosing a diaphragm space and a simple positive element axially aligned in front thereof, the middle component being negative and all three components being concave toward the diaphragm space, in which the simple front component has a refractive index greater than 1.68 and a dioptric power between +0.5/f and 0.8/f where f is the local length of the objective, in which each of the two rear components consists of a biconvex element cemented to a biconcave element, the refractive index of the rear element of each doublet exceeding that of the front element thereof by between 0.10 and 0.17, in which the power of the cemented surface of the middle component is betwen ⅙ f and ⅛ f, and in which the curvature of the rearmost surface numerically exceeds that of the front surface of the rear component by between 0.65/f and 1/f, the radius of curvature of each optical surface of the objective being between f/6 and 5 f, the over-all length of the objective being between 0.35 f and 0.55 f, and each refractive index being between 1.55 and 1.90.

5. An objective according to claim 4 in which the power of the middle component is between −0.8/f and −1.7/f and that of the rear component is between 0.7/f and 1.6/f.

6. A photographic objective consisting of two cemented doublets enclosing a diaphragm space and a simple positive element axially aligned in front thereof, the middle component being negative and all three components being concave toward the diaphragm space, in which the simple front component has a refractive index greater than 1.68 and is so shaped that the curvature of the front surface thereof exceeds 1.1 times the curvature of the rear surface thereof by between 0.5/f and 0.85/f where f is the focal length of the objective, the curvature of the rearmost surface numerically exceeds that of the front surface of the rear component by between 0.65/f and 1/f, and each of the two rear components consists of a biconvex element cemented to a biconcave element, the refractive index of the rear element of each doublet exceeding that of the front element thereof by between 0.10 and 0.17, the radius of curvature of each optical surface of the objective being between f/6 and 5 f, the over-all length of the objective being between 0.35 f and 0.55 f, and each refractive index being between 1.55 and 1.90.

7. A photographic objective corrected for color and the five ordinary aberrations and comprising a simple front component and two doublet components therebehind in which the radii of curvature R of the lens surfaces, the refractive indices N of the lens elements, the thicknesses $t$ of the lens elements and the spaces $s$ between lens components, each numbered by subscripts from front to rear, are as follows:

$$0.4\ f < +R_1 < 0.6\ f$$
$$0.7\ f < +R_2 < 1.3\ f$$
$$0.2\ f < +R_3 < 0.4\ f$$
$$0.7\ f < -R_4 < f$$
$$0.2\ f < +R_5 < 0.3\ f$$
$$1.2\ f < -R_6 < 3.5\ f$$
$$0.2\ f < +R_7 < 0.5\ f$$
$$0.6\ f < -R_8 < f$$
$$1.65 < N_1 < 1.75$$
$$1.65 < N_2 < 1.75$$
$$1.75 < N_3 < 1.85$$
$$1.55 < N_4 < 1.65$$
$$1.70 < N_5 < 1.80$$
$$0.06\ f < t_1 < 0.09\ f$$
$$0.10\ f < t_2 < 0.11\ f$$
$$0.02\ f < t_3 < 0.03\ f$$
$$0.01\ f < t_4 < 0.05\ f$$
$$0.09\ f < t_5 < 0.12\ f$$
$$0.09\ f < s_1 < 0.01\ f$$
$$0.09\ f < s_2 < 0.11\ f$$

where f is the focal length of the objective as a whole.

8. A photographic objective constructed substantially according to the following table:

| Lens | N | V | Radii | Thicknesses |
| --- | --- | --- | --- | --- |
| 1 | 1.70 | 56 | $R_1=+0.46\ f$ | $t_1=0.06\ f$ |
|  |  |  | $R_2=+0.76\ f$ | $s_1=0.00\ f$ |
| 2 | 1.70 | 56 | $R_3=+0.28\ f$ | $t_2=0.11\ f$ |
|  |  |  | $R_4=-0.82\ f$ |  |
| 3 | 1.80 | 42 | $R_5=+0.21\ f$ | $t_3=0.03\ f$ |
|  |  |  |  | $s_2=0.11\ f$ |
| 4 | 1.60 | 40 | $R_6=-1.43\ f$ | $t_4=0.02\ f$ |
| 5 | 1.74 | 46 | $R_7=+0.23\ f$ | $t_5=0.10\ f$ |
|  |  |  | $R_8=-0.68\ f$ |  | where f is the focal length of the objective, where the lens elements are numbered in the first column in order from front to rear and the corresponding refractive indices N for the D line of the spectrum and the dispersive indices V are given in the second and third columns, and where the radii R of the lens surfaces, the thicknesses $t$ of the lens elements and the spaces $s$ between components, each numbered by subscripts from front to rear, are given in the last two columns.

9. A photographic objective constructed substantially according to the following table:

| Lens | N | V | Radii | Thicknesses |
| --- | --- | --- | --- | --- |
| 1 | 1.70 | 56 | $R_1=+0.57\ f$ | $t_1=0.08\ f$ |
|  |  |  | $R_2=+1.19\ f$ | $s_1=0.01\ f$ |
| 2 | 1.70 | 56 | $R_3=+0.31\ f$ | $t_2=0.11\ f$ |
| 3 | 1.80 | 42 | $R_4=-0.81\ f$ | $t_3=0.03\ f$ |
|  |  |  | $R_5=+0.25\ f$ | $s_2=0.11\ f$ |
| 4 | 1.60 | 40 | $R_6=-3.4\ f$ | $t_4=0.04\ f$ |
| 5 | 1.74 | 46 | $R_7=+0.48\ f$ | $t_5=0.11\ f$ |
|  |  |  | $R_8=-0.90\ f$ |  | where f is the focal length of the objective, where the lens elements are numbered in the first column in order from front to rear and the corresponding refractive indices N for the D line of the spectrum and the dispersive indices V are given in the second and third columns, and where the radii R of the lens surfaces, the thicknesses $t$ of the lens elements and the spaces $s$ between components, each numbered by subscripts from front to rear, are given in the last two columns.

References Cited in the file of this patent
UNITED STATES PATENTS

| | | |
| --- | --- | --- |
| 1,880,394 | Altman | Oct. 4, 1932 |
| 1,998,704 | Bertele | Apr. 23, 1935 |
| 2,186,622 | Bertele | Jan. 9, 1940 |
| 2,562,012 | Bertele | July 24, 1951 |
| 2,623,434 | Bechtold | Dec. 30, 1952 |